April 21, 1925.
O. J. HOAGLAND
FISHING ROD HOLDER
Filed Sept. 6, 1923
1,534,642
2 Sheets-Sheet 2
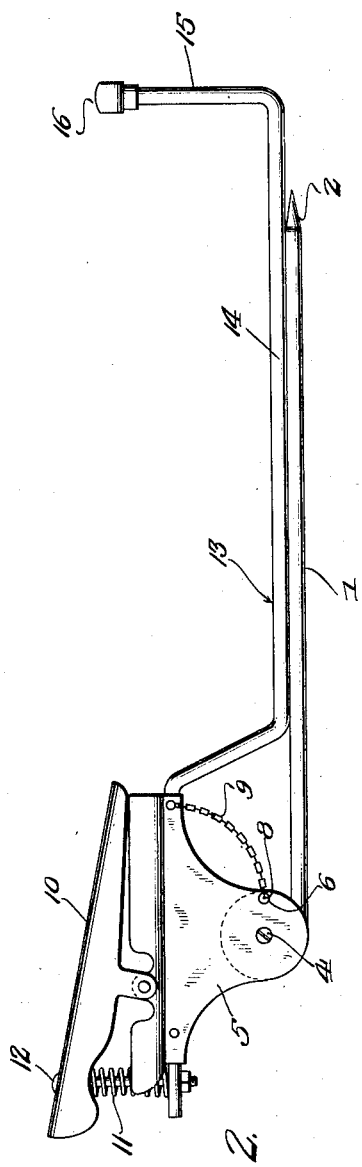
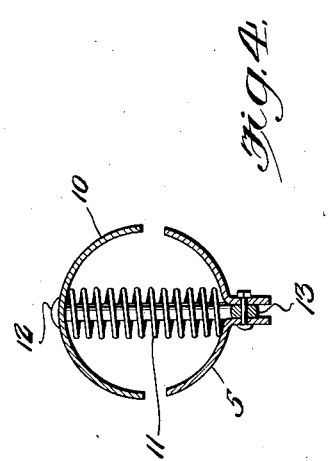
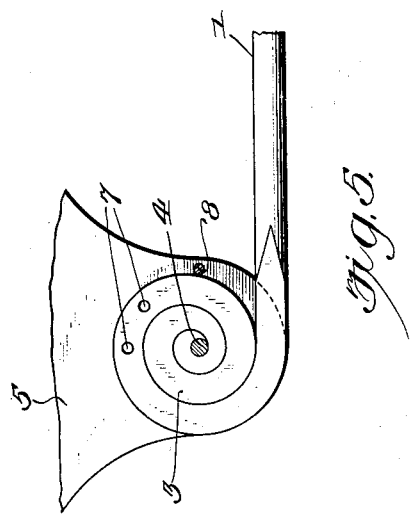
INVENTOR.
Orville John Hoagland
BY
John P. Duffie
ATTORNEY.

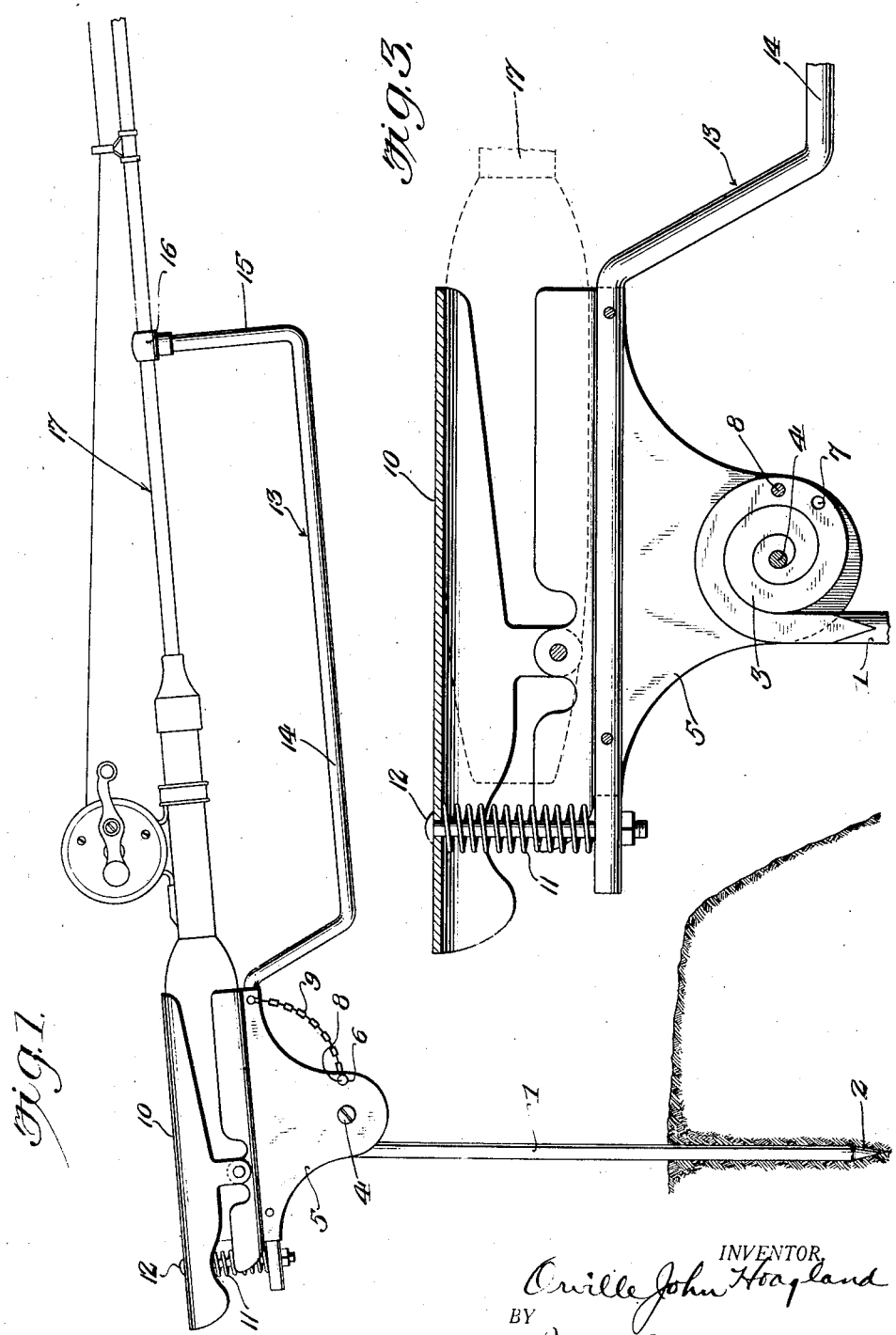

Patented Apr. 21, 1925.

1,534,642

UNITED STATES PATENT OFFICE.

ORVILLE JOHN HOAGLAND, OF PERU, INDIANA.

FISHING-ROD HOLDER.

Application filed September 6, 1923. Serial No. 661,227.

*To all whom it may concern:*

Be it known that I, ORVILLE J. HOAGLAND, a citizen of the United States, residing at Peru, in the county of Miami and State of Indiana, have invented certain new and useful Improvements in Fishing-Rod Holders, of which the following is a specification.

This invention relates to fishing rod holders and it consists in the novel features hereinafter described and claimed.

An object of the invention is to provide a fishing rod holder of simple and durable structure adapted to be set up upon a bank or other support and which will hold the rod while the line and bait are in the water thus relieving the fisherman of the labor of supporting the line and enabling him to retreat from the fishing point and observe from a distance the line and pole. Several such devices may be used by a single fisherman and in that his personal attention is not required at any one until a strike is made the time which is lost when but a single device and rod is used, is put in to advantage.

With the above object in view the holder comprises a shaft adapted to be driven into the ground or other support. A clamping member is pivoted upon the end of the shaft and means are provided for holding the clamping member at a desired angle with relation to the shaft. A spring pressed clamping jaw is pivoted to the clamping member and is adapted to bear upon the rod and hold the same upon the clamping member. A brace rod is secured to the clamping member and extends outwardly from the same and is provided at its outer end with a crotch adapted to receive the intermediate portion of the fishing rod whereby the rod is securely held and braced with relation to the rod holder.

In the accompanying drawings—

Figure 1 is a side elevation of the fishing rod holder showing the same extended and a rod supported therein.

Figure 2 is a side elevation of the fishing rod holder showing the parts folded together.

Figure 3 is a fragmentary longitudinal sectional view of one portion of the holder.

Figure 4 is a transverse sectional view.

The other figures are detailed views of the features of the invention.

The fishing rod holder comprises a shaft 1 which is pointed at one end as at 2. The pointed end is adapted to be driven into the ground or other support whereby the device is supported when in use. The upper or opposite end of the shaft 1 is coiled as at 3 and a pivot bolt 4 is mounted at the center of the helix of the coil. A clamping member 5 is mounted for swinging movement upon the bolt 4 and is provided with an opening 6 located over the outer convolution of the coil.

The outer convolution of the coil is provided with several spaced openings 7 any one of which is adapted to be brought into register with the opening 6. When an opening 7 is in register with the opening 6 a pin 8 may be passed through the registering openings whereby the clamping member is held at a desired angle with relation to the shaft 1. The pin is connected by means of a chain 9 with the clamping member.

A jaw 10 is pivoted at a point between its ends upon the upper portion of the clamping member and at a point between the side edges thereof. A coil spring 11 is interposed between the ends of the jaw 10 and the clamping member and is under tension with a tendency to hold the other end of the jaw toward the body of the clamping member. The spring is held in place by a bolt 12 which passes transversely through the jaw and the clamping member and which traverses the length of the spring.

A brace rod 13 is fixed to the clamping member at a point above the upper end of the shaft. The intermediate portion of the brace rod is depressed as at 14 and the outer end portion 15 of the said brace is disposed at a right angle to the intermediate portion thereof and carries at its upper extremity a rod receiving crotch 16 which is alined with the gripping space or rod end receiving space between the clamping member and the jaw. The fishing rod is illustrated at 17.

The device is set up by driving the pointed end of the shaft into the ground or other support. The clamping member is disposed at a desired angle with relation to the shaft and is fixed by inserting the pin in the registering openings as hereinbefore described. The handle end of the rod 17 is inserted between the clamping member and the gripping end of the jaw and is held under the tension of the coil spring. The intermediate portion of the rod is permitted to rest in the crotch 16. The hook (not shown) is then baited and together with the fishing line is cast out. Thus the line and its attachments are supported and the fisherman may retire and await results the indications of which will be apparent by the movement of the fishing line or cork, if one is used.

When a strike is made the rod is removed from the holder and the fish is recovered in the usual manner and the rod may then be rebaited and reset. For transportation, storage or other similar purposes the shaft 1 may be folded up against the the portion 14 of the brace rod and thus the parts are closely assembled and will take up but little space in the kit or may be conveniently carried in the hand along with the fishing rod.

Having described the invention what is claimed is—

A fishing rod holder comprising a supporting rod, a rod clamp consisting of pivotally connected jaws, one of the jaws being pivotally connected to the supporting rod, an arm fixed to the said jaw of the clamp and having an end portion extending beyond the end of the clamp and having a rod rest, a bolt connected with said arm and passing through the other clamp jaw and a spring coiled around said bolt and interposed between the last mentioned clamp jaw and the arm.

In testimony whereof I affix my signature.

ORVILLE JOHN HOAGLAND.